_United States Patent Office_

3,532,778
Patented Oct. 6, 1970

3,532,778
ART OF PRODUCING SHAPED, MODIFIED, CONDENSATION POLYMERS
Saunders E. Jamison, Summit, and Michael Dunay, Fanwood, N.J., assignors to Celanese Corporation, a corporation of Delaware
No Drawing. Continuation of application Ser. No. 489,401, Sept. 22, 1965. This application Oct. 23, 1968, Ser. No. 770,898
Int. Cl. D01f 7/00, 3/10
U.S. Cl. 264—78                    14 Claims

ABSTRACT OF THE DISCLOSURE

Extrudable liquid compositions and wet formed, e.g. filamentary material of enhanced dyeability based upon the combination with a wet formable difficultly meltable condensation polymer such as poly(polymethylene)terephthalamide of from 0.5 to 30 percent of a basic nitrogen polymer such as a vinylpyridine polymer produced with a solution thereof in a solvent therefor.

---

This is a continuation of Ser. No. 489,401 filed Sept. 22, 1965.

This invention relates broadly to the production of shaped articles and, more particularly, shaped synthetic articles having improved dyeability. Still more particularly the invention is concerned with the art of producing shaped, modified, condensation polymers; and is especially concerned with the preparation of a particular class of such shaped polymers in film, fiber or other form. This class, the members of which are modified in accordance with this invention, includes shaped, wet-formed, difficultly-meltable polymers, especially fiber-forming (fiberformable) condensation polymers having nitrogen and/or oxygen atoms, and preferably both nitrogen and oxygen atoms, as a part of the polymer chain. More specific examples of such condensation polymers are the high-melting polycarbonamides, particularly those melting above 275° C., such as polyhexamethylene terephthalamide.

By "difficultly-meltable" polymers as that term is used herein are meant polymers that cannot be shaped easily using melt-extrusion techniques because they tend to degrade materially and/or to polymerize further to a useless, infusible mass when heated sufficiently to melt them.

It was known prior to the present invention that the polymers which are modified, and used in modified form in practicing this invention, could be formed into shaped articles, specifically filaments or fibers. See, for example, U.S. Pats. 3,154,512 and 3,154,612 of Parczewski; 3,154,609, Cipriani; 3,154,610, Denyes; and 3,154,613, Epstein et al., each dated Oct. 27, 1964; and 3,179,618, Roberts, dated Apr. 20, 1965.

This invention provides means for increasing the dyeability of the final product; and, more particularly, by incorporating into the difficultly-meltable polymer (hereafter for clarity or convenience sometimes designated as the "primary" polymer) a modifying polymer thereby to improve the dyeability, including acid and disperse dyeability, of the washed and dried article or material. The scope of the invention includes composition, method and article features.

The present invention is based on our discovery that shaped articles having improved dye-receptivity can be produced by incorporating into the aforementioned primary polymer, before it is wet-formed (e.g., wet-spun) a minor amount of a modifying polymer, more particularly from 0.5 to 30%, preferably from 0.5 to 15%, by weight of the total amount of the primary and modifying polymers. The modifying polymer is a polymer of a polymerizable organic compound, more particularly a polymer of a polymerizable ethylenically unsaturated organic compound, that contains basic nitrogen. Preferably the modifying polymer is a polymer of a vinyl-substituted heterocyclic tertiary amine, especially a vinylpyridine, including the otherwise unsubstituted vinylpyridines and the (lower-alkyl)-substituted vinylpyridines, e.g., the various methyl- and ethyl-substituted vinylpyridines. The primary polymer and the modifying basic nitrogen-containing polymer should be selected from those which are compatible with each other in dissolved state.

More particularly the present invention is based on our discovery that the above-described modifying polymer can be added to the type of solvent required to dissolve the primary polymer such as, for example, sulfuric acid containing at least 75% by weight of $H_2SO_4$; and that a sufficient amount of this modifying polymer is retained in the coagulated shaped article, e.g., gelled filamentary material, even after passage through a sulfuric acid coagulating bath of lower acid concentration than that used to dissolve the polymeric material, and after still further processing, so that a finished article is obtained having improved dye-receptivity as compared with a similarly produced unmodified shaped article. This was quite surprising and unobvious, since normally it would be expected that a modifying polymer of this kind would be completely leached out of the coagulated shaped article during its passage through the coagulating bath and subsequent treatments including washing, and especially so when it is considered that strongly acidic solvents such as sulfuric acid add to the basic nitrogen atoms in the polymer to form the corresponding salt and the salt form of a polymer is generally recognized as being more readily dissolved than the free-base form.

To be more specific: Poly(5-ethyl-2-vinylpyridine), herein for brevity sometimes designated as PEVP, is typical of vinylpyridines that are readily soluble in a coagulating bath of about 50% aqueous sulfuric acid. Furthermore, extensively-dissociating salts such as PEVP-sulfate are, in general, highly soluble in water. It is also known that additive materials frequently either weaken synthetic fibers or cause coagulation of the solution to become very difficult in wet-forming procedures. These factual matters point up strikingly the unobvious results obtained in practicing the present invention and whereby a substantial amount of the basic polymer additive is carried through into the final polymer to provide improved dye-receptivity.

THE PRIMARY POLYMER

The primary polymers that are modified to improve their dyeability, especially acid dyeability, in practicing this invention have been briefly described in the first paragraph of this specification. Preferably the primary polymers are those wet-formable, difficultly-meltable polymers having repeating =NCO— groups, more particularly —NRCO— groups where R represents hydrogen or a monovalent organic radical, e.g., a hydrocarbon radical such as a lower-alkyl radical. Such polymers include the difficultly-meltable polyamides such as those wherein the —NRCO— groups are attached to carbon atoms on each side; the polyurethanes which contain repeating =NCOO— groups, more particularly —NRCOO— groups; the polyureas which contain repeating =NCON= groups, more particularly —RNCONR— groups; and similar condensation polymers.

There is no particular advantage in wet-forming, e.g., wet-spinning, polymers that are adapted to be melt-extruded through orifices, slots or other shaped openings to form the shaped body. However, in the case of the high-melting or difficultly-meltable polymers, such polymers must be wet-spun rather than melt-spun. Wet-spinning often leads to voids that adversely affect certain properties, e.g., dyeability of the spun filaments of yarn. The present invention is one solution to this problem. It provides practical means for improving the acid dyeability (i.e., receptivity to acid dyes) of the polymer without any material adverse effect on its other useful and commercially advantageous properties. Furthermore, it lends itself readily to the continuous spinning of filamentary materials since the technique involves essentially the modification of the primary polymer while both the primary and modifying polymers are dissolved in a mutual solvent to form a new extrudable liquid composition or spinning "dope."

The technique of the instant invention is most useful in preparing shaped articles formed of high-melting polymers, more particularly those melting above 210° C. and especially above 275° C.; polyurethanes and polyureas melting above 179° C., especially above 210° C.; and in general, polymers having cyclic groups such as 1,4-cyclohexylene and/or heterocyclic groups such as piperazylene or an alkyl-substituted piperazylene group, e.g., 2-(loweralkyl)piperazylene such as 2,6-dimethylpiperazylene, as an integral part of the polymer molecule.

Some contemplated polyamides are, for example, those having repeating structural units of the formula:

—NR—Y—NR′—CO—Y′—CO— that result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower-alkyl radicals such as methyl or ethyl, and the Y's, which also may be the same or different, are divalent organic radicals such as alkylene, e.g., ethylene, tetramethylene or hexamethylene, arylene such as para- and meta-phenylene, para- and meta-xylylene, and para- and meta-diethylenebenzene, cycloalkylene such as 1,4-cyclohexylene and divalent heterocyclic radicals such as those derived from piperazine, and monoalkyl- and dialkylpiperazines, e.g., 2-methyl- and 2,5-dimethylpiperazines and 2-ethyl- and 2,5-diethylpiperazines, wherein the open bonds are attached to the nitrogen atoms, and wherein the chemical structure of the polymer and/or the polymerization technique used is such that a relatively high-melting polymer is obtained.

An important group of polyamides within the above group, and which may be modified in accordance with this invention, includes those in which Y and/or Y′ is or contains a para- or meta-phenylene radical or a 1,4-cyclohexylene radical. Particularly important are condensation products of a diamine and terephthalic acid or a derivative of terephthalic acid, e.g., terephthalyl chloride or a dialkyl terephthalate. Some specific polymers within this latter group are poly(polymethylene)terephthalamides wherein the polymethylene groups contain from 2 to 10 carbon atoms, inclusive, e.g., polyhexamethylene terephthalamide, polyoctamethylene terephthalamide, polytetramethylene terephthalamide, polyethylene terephthalamide, and polypiperazylene terephthalamide. Other polyterephthalamides are poly(o-, m-, and p-phenylene) terephthalamides, poly(o-, m-, and p-xylylene)terephthalamides and poly-(o-, m-, and p-diethylenephenylene) terephthalamides, the latter produced, for example, by condensing an ester-forming derivative of terephthalic acid with para-bis(beta-aminoethyl)benzene.

The technique of this invention is applicable in the production of filaments and other shaped articles of high-melting polyamides of aromatic acids other than terephthalic acid, e.g., of isophthalic acid, 2,6-naphthalenedicarboxylic acid, p,p′-dicarboxydiphenyl, (p,p′-dicarboxydiphenyl)methane, phenylenediacetic acid, phenylenedipropionic acid, and phenylenedibutyric acid. The diamine moieties of these other aromatic carboxylic acids may be the same as in the aforementioned polyterephthalamides. Illustrative, then, of polyamides other than the polyterephthamides are the polyisophthalamides, specifically polyethylene isophthalamide. The present invention also may be employed in modifying high-melting polyamides resulting from a condensation reaction between (a) alkylene dicarboxylic acids such as adipic acid and (b) cyclic diamines such as p-xylene diamine and p-bis(aminoethylbenzene).

Also contemplated is the modification of high-melting, autocondensation polymers (e.g., those melting above 275° C.) of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl-4-aminocyclohexane or its lactam, 1-carboxy-4-aminocyclohexane or its lactam and 1-carboxymethyl-3-aminocyclopentane or its lactam.

Polyurethanes that may be modified in accordance with this invention are polymers having repeating structural units of the formula

—NR—Y—NR′—CO—O—Y′—CO—O— and resulting, for example, from the condensation of a diisocyanate with a dihydric alcohol or phenol or the condensation of a diamine with a bis(chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly suitable for modification and subsequent use in practicing this invention are polyurethanes prepared from dihydric alcohols or phenols containing a meta- or para-phenylene or a 1,4-cyclohexylene radical. Some specific polyurethanes which may thus be modified are the condensation product of piperazine with the bis-(chloroformate) of bis(p-hydroxyphenyl)-propane - 2,2, the condensation product of piperazine with the bis-(chloroformate) of hydroquinone and the condensation product of tetramethylene diamine with the bis(chloroformate) of butanediol-1,4, each of which has a melting point above 210° C.

Polyureas that may be modified and the modified polyurea in solution state then wet-formed include those having repeating structural units of the formula

—CO—NR—Y—NR—CO—NR′—Y′—NR′— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha,beta-diurea with a diamine, the chemical structure of the polymer and/or the polymerization technique being such that a polymer melting above 179° C., preferably above 210° C., is obtained. Some specific polyureas that may be modified and thereafter employed in practicing this invention are those obtained from the reaction of hexamethylene diisocyanate with hexamethylene diamine and from the reaction of m-phenylene diisocyanate with m-phenylene diamine, each of which polyurea melts above 210° C.

THE MODIFYING POLYMER

The modifying polymer that is employed to impart improved acid dye-receptivity to the primary polymer is a polymer (especially a thermoplastic polymer) of a polymerizable organic compound containing basic nitrogen, more particularly a polymer of a polymerizable ethylenically unsaturated organic compound that contains basic nitrogen, and especially one that contains a terminal ethylenically unsaturated grouping such as a $$CH_2=C<$$

grouping. We prefer to use a polymer of a vinyl-substituted heterocyclic amine, e.g., a vinylpyridine. Thus, there may be used in making the modifying polymer, vinylpyridines represented by the formula:

I 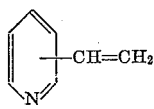

and which include 2-vinylpyridine, 3-vinylpyridine and 4-vinylpyridine; methyl vinylpyridines represented by the formula:

II 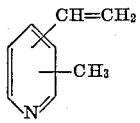

and which include 2-methyl-3-vinylpyridine, 3-vinyl-4-methylpyridine, 3 - vinyl - 5 - methylpyridine, 2-vinyl-3-methylpyridine, 2-vinyl - 4 - methylpyridine, 2-vinyl-6-methylpyridine, 2-methyl - 4 - vinylpyridine and 3-methyl-4-vinylpyridine. The vinylpyridines embraced by Formula II are a sub-group within a broader class of vinylpyridines that are advantageously employed in modifying the primary polymer. This sub-group may be represented by the general formula III 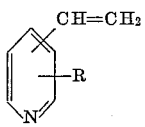

and wherein R represents a lower alkyl radical, more particularly a methyl, ethyl, propyl (including n-propyl and isopropyl), butyl (including n-butyl, isobutyl, sec.-butyl and tert.-butyl) radical, or a normal or isomeric pentyl radical. Other examples include 2-vinyl-4,6-dimethylpyridine, the 2- and 4-vinylquinolines, 2-vinyl-4,6-diethylpyridine and others embraced by the formula IV 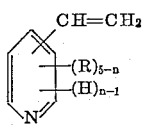

wherein R represents a lower alkyl radical, examples of which have been given hereinbefore, and $n$ represents an integer from 1 to 5, inclusive.

Other examples of ethylenically unsaturated monomers containing a basic nitrogen atom that can be homopolymerized or copolymerized with another or a plurality of ethylenically unsaturated compounds to form polymers that can be employed to modify the primary polymer are 1-vinylbenzimidazole, 2-vinylbenzimidazole, 1-substituted (e.g., 1-alkyl, 1-aryl, etc.)-2-vinylbenzimidazole, 4-vinylbenzimidazole, 5-vinylbenzimidazole, 6-vinylbenzimidazole, and the various vinylimidazolines, including 2-vinylimidazoline and the 1-substituted 2-vinylimidazolines. Other examples include the amino alcohol esters (wherein the amino nitrogen is tertiary) of ethylenically unsaturated monocarboxylic acids, e.g., acrylic, methacrylic, ethacrylic, cinnamic, crotonic, tiglic, etc., acids, including the dimethyl-, diethyl-, di-n-propyl-, diisopropyl- and other dialkyl-amino alcohol esters of, for example, acrylic and methacrylic acids; also polyesters (diesters, triesters, etc.) of an ethylenically unsaturated polycarboxylic acid with an amino alcohol in which the amino nitrogen is tertiary, including, for instance, a diester of an alpha,beta-ethylenically unsaturated dicarboxylic acid (or ethylenically unsaturated alpha,beta-dicarboxylic acid) with such an amino alcohol, e.g., bis(2-diethylaminoethyl)fumarate and other fumaric, maleic, mesaconic and citraconic diesters of a monoamino monohydric primary alcohol in which the amino nitrogen is tertiary, as well as the corresponding itaconic polyesters. The preparation of these and other polymerizable esters containing a basic nitrogen atom is described in U.S. Pat. No. 2,723,967.

Additional examples of ethylenically unsaturated monomers containing a basic nitrogen atom from which homopolymers and copolymers can be made that can be used in practicing this invention are the ortho-, meta- and para-aminostyrenes and -aminoisopropenylbenzenes wherein the amino nitrogen is tertiary, e.g., the dimethyl-, diethyl- and other dialkyl-, especially di-(lower alkyl), -aminostyrenes and -isopropenylbenzenes. These monomers are embraced by the general formula:

V 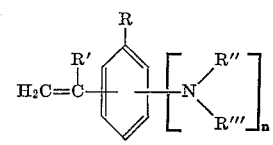

wherein R and R' each represent a member of the group consisting of hydrogen and the methyl radical, R'' and R''' each represent an alkyl radical, preferably a lower alkyl radical, which may be the same or different, more particularly alkyl radicals containing from 1 to 5 carbon atoms, inclusive, viz, methyl, ethyl and the normal and isomeric forms of propyl through pentyl radicals, and $n$ represents 1 or 2. Specific examples of mono- and di-tertiary-alkylaminostyrenes, -vinyltoluenes, -isopropenylbenzenes and -isopropenyltoluenes will be apparent to those skilled in the art from Formula V, from the definitions of R, R', R'', R''' and $n$, and from the specific examples of alkyl radicals represented by R'' and R'''.

Other examples of ethylenically unsaturated monomers that may be employed in making the modifying polymer are compounds represented by the general formula VI 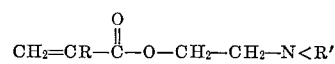

wherein R represents a member of the group consisting of hydrogen and the methyl radical, and —N<R' represents the residue of a heterocyclic tertiary amine. Illustrative examples of radicals represented by —N<R' in Formula VI are morpholinyl, thiamorpholinyl, piperidyl, pyrrolidyl, piperazyl, imidazolyl, pyrazolyl, pyrryl, pyrrolyl and the like. The formulas for these radicals and the preparation of compounds of the kind embraced by Formula VI are given in, for example, U.S. Pat. No. 2,727,021. Specific examples of such compounds are 2-(4'-morpholinyl)ethyl acrylates and methacrylates. Other examples will be apparent to those skilled in the art from Formula VI, from the definitions of R and —N<R', and from the specific examples of radicals represented by —N<R'.

The modifying polymer is a minor amount of the total polymer content of the extrudable liquid composition, e.g., a spinning dope, containing the primary and modifying polymers. Usually, and especially when the modifying polymer is a homopolymer, the modifying polymer constitutes from about 0.5% to about 15%, preferably from about 1 to about 10%, by weight of the total amount of the primary and modifying polymers. However, the use of lower or higher percentage amounts is not precluded so long as a sufficient amount of the modifying polymer is carried through the wet-forming operations and remains in the final dried shaped article, e.g., filamentary material, in an amount such that there is an improvement in acid dye-receptivity as compared with unmodified primary polymer that has been processed in the same way. For example, when the modifying polymer is one that is exceedingly soluble in the liquid coagulating bath, e.g., aqueous sulfuric acid having a concentration of $H_2SO_4$ lower than that employed to dissolve the primary and modifying polymers, then it may be necessary to use the modifying polymer in an amount above 15%, e.g., 20 or 25%, or even 30%, by weight of the total of the primary and modifying polymers.

Some of the ethylenically unsaturated monomers containing basic nitrogen are difficult to homopolymerize by conventional techniques, but can be readily copolymerized (or copolymerized with no great difficulty) with other ethylenically unsaturated compounds, particularly those having terminal ethylenic unsaturation such as a

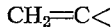

grouping. Hence, in some cases it may be desirable to use a copolymer of a plurality of copolymerizable monomers including (a) a monomer having terminal ethylenic unsaturation, e.g., a $CH_2\!\!=\!\!C\!<$ grouping, and which contains a basic nitrogen atom, numerous examples of which have been given hereinbefore, and (b) a monomer having terminal ethylenic unsaturation, e.g., a $CH_2\!\!=\!\!C\!<$ grouping, and which does not contain a basic nitrogen atom, e.g., acrylonitrile, methacrylonitrile, vinyl and vinylidene halides, especially the chlorides and fluorides, vinylcarbazoles, vinyl and allyl silanes, the vinyl-substituted nuclearly halogenated (chlorinated, brominated, fluorinated, etc.) benzenes and toluenes, and others that will be apparent to those skilled in the art from the foregoing examples.

The aforementioned copolymers are prepared by any of the known methods. The proportions of monomers and the polymerization techniques are advantageously chosen so that the final copolymer contains as large a weight percentage as possible of the basic nitrogen-containing component, e.g., at least 35%, and preferably from 50 to 90% or more. Such modifying copolymers may then constitute, for instance, from 1 or 2% to 25 or 30% by weight of the total amount of primary polymer and modifying copolymer. Thus, the proportions may be such that, on a weight basis, the amount of the basic nitrogen-containing component of the copolymer corresponds to from about 0.5% to about 15% or more (depending upon the solubility of the copolymer during wet-forming and subsequent processing) by weight of the total amount of the primary polymer and the aforesaid amount of the basic nitrogen-containing component in the copolymer.

The polymer-containing solvent solutions or dopes which are prepared and extruded to produce a shaped article are preferably made by dissolving the primary and modifying polymers in sulfuric acid containing at least 75%, more particularly at least 80%, by weight of $H_2SO_4$. Preferably, too, the sulfuric acid is concentrated sulfuric acid containing 95 to 100% by weight of $H_2SO_4$. Fuming sulfuric acid, e.g., such acid containing up to 6 or 7% by weight or even higher of free $SO_3$, also may be employed. A suitable concentration of polymeric material in the dope is in the range of, for example, from 5 to 30% by weight.

The use of solvents for the modified difficultly-meltable condensation polymer other than sulfuric acid is not precluded. For example, instead of using sulfuric acid as a solvent, one may employ a solvent containing over 85% by weight of phosphoric acid (see U.S. Pat. 3,154,612, supra); or a solvent comprising at least 70% by weight of antimony trichloride and formic acid or acetic acid as a diluent in an amount up to 30% by weight of the solvent (see U.S. Pat. 3,154,512, supra).

The liquid coagulant or spin-bath composition is a liquid in which the solvent employed to dissolve the polymeric material is soluble but in which the condensation polymer is insoluble and the modifying polymer is at least partly insoluble. Generally it is desirable to use, as the liquid coagulant, a liquid containing a lower concentration of the same solvating agent employed in making the solution of polymeric material, said lower concentration being such that the polymeric material is coagulated into a gelled structure such as a sheet, film, tape, ribbon, band, rod, tube, bar, cylinder, monofilaments, multifilaments (including tow), and the like. Thus, when the solvent in which the modified, difficultly-meltable condensation polymer is dissolved is sulfuric acid containing at least 75%, or at least 80%, by weight of $H_2SO_4$, the liquid coagulating bath is preferably aqueous sulfuric acid having a concentration of $H_2SO_4$ lower than that of the sulfuric acid in which the modified primary polymer is dissolved and, as aforementioned, such that the solution of the polymeric material is coagulated into the form of a gelled structure or body.

When using the preferred liquid coagulant, i.e., aqueous sulfuric acid, the concentration of sulfuric acid in said liquid coagulant may be varied considerably depending upon, for example, the particular primary and modifying polymers employed, the proportions of each, the temperature of the liquid coagulating bath and/or other modifications of the process and/or the properties other than improved dyeability that are wanted in the final product. However, such acid concentration, especially when wet-forming polyterephthalamides such as polyhexamethylene terephthalamide, i.e., poly(hexamethylene-terephthalamide), may be below about 60% by weight $H_2SO_4$, e.g., from 0% to 50%, or more advantageously in some cases from 40% to 50%. By "0%" it is meant that water alone is the liquid coagulant into which the sulfuric acid solution of the polymer is extruded to form the gelled structure, the liquid coagulant then becoming acidified with $H_2SO_4$ as it extracts this acid from the gelled structure during passage of the latter through the liquid coagulating bath.

When gelled films (especially such films which yield a transparent film as a final product) are to be prepared, the use of lower sulfuric acid concentration of the liquid coagulant, for example below about 40% $H_2SO_4$, more particularly within the range of from 0% to 30 or 35% $H_2SO_4$, is conducive to the formation of thicker films if and when desired.

The temperature of the coagulating bath may be varied as desired or as may be required depending, for example, upon the particular primary and modifying polymers employed, the particular solvent used to dissolve the polymeric material, the particular liquid coagulant used, the extrusion rate, the particular properties desired in the final product, and other influencing factors. Thus, the bath temperature may range, for example, from room temperature (20°–30° C.) to about 100° C., but preferably is within the range of from about 40° C. to about 60° C. When necessary, heating coils or other sources of heat may be provided in order to maintain the coagulating bath at the desired temperature above ambient temperature.

In one embodiment of this invention wherein gelled filaments are continuously pulled through a coagulating bath the said filaments, while still in the coagulating bath, are brought into contact with at least two, smooth, curved surfaces which are so positioned with respect to each other, and with respect to the direction of travel of the moving filamentary material, that the said filamentary material is caused to so reverse its direction that its angle of bend is at least about 40°. Thus, the angle of bend or snubbing angle may be within the range of from about 40° to about 120°, more particularly from about 60° to 90°, e.g., 60°, 70°, 80° or 90°. In similarly orienting films, the snubbing angle may be up to 180°.

The smooth, curved surfaces to which reference has been made in the preceding paragraph may take the form of two rods or pins that are so positioned as to provide the aforementioned angle of bend. Such rods or pins may be formed of, or at least surfaced with, a smooth, hard, wear-resistant surface such as those that are commercially available under such names as Alsimag (and which is understood to be an aluminum magnesium silicate), Heanium (mainly $Al_2O_3$), and the like.

The rods or pins mentioned in the preceding paragraph may be disposed in the coagulating bath so that they extend vertically downwardly into the bath of liquid coagulant. Since the amount of tension imposed upon the filamentary material (for the same rod or pin diameter) is dependent upon the relative orientation of the rods, it is desirable to mount both rods upon a common head. Such a head may take the form of a fork mechanism for mounting a pair of rods as is shown in the copending application of one of us (Saunders E. Jamison), Ser. No. 233,827, filed Oct. 29, 1962, and assigned to the same assignee as the present invention. Thus, by merely rotating a shaft to which is attached a mounting head carrying the two rods in spaced relationship, the said two rods can be readily disposed at the desired angular position with regard to the direction of travel of the gelled filamentary material.

With regard to the foregoing comment concrening the amount of tension imposed upon the filamentary material by the rods or pins, it may be further mentioned that the amount or degree of tension exerted by such rods or pins is proportional to the friction imposed upon the moving filamentary material and that the latter, in turn, depends upon the contact distance. Hence the diameter of the snubbing pin or rod is important. In the technique herein described with reference to the angle of bend or snubbing angle of the moving filaments, the diameter of the pin or rod over which the filamentary material was passed, when calculating the snubbing angle, was ¼ inch. Consequently, it is to be understood that in the description herein given with reference to the angle of bend of the moving filamentary material, the stated angle of bend provides friction or tension corresponding to that obtained when the moving filamentary material is passed, at the specified angle of bend, over a rod or pin ¼ inch in diameter.

It is not essential that the rods or pins extend vertically downwardly into the bath of liquid coagulant. Thus, if desired, they may be positioned horizontally in the coagulating bath.

Also, it is not essential that one use stationary rods or pins in the coagulating bath as tension-inducing members positioned to provide the desired degree of tension. For example, a pair of positively driven rotating rolls may be utilized. Such rolls are each rotated at the same speed, which speed is less than that of the take-up roll. Accordingly, by winding the gelled filamentary material about each of such rotating rolls positioned in the coagulating bath and about the take-up roll, more or less tension (as desired or as conditions may require) can be imposed upon the filamentary material while it is in the coagulating bath. The amount of induced tension can be controlled by varying the differential in speed of rotation between the pair of such rollers in the bath of liquid coagulant and the take-up roll.

After being oriented by snubbing in the coagulating bath, the oriented gelled filamentary material may be relaxed by any suitable means in order to provide enhanced dyebath diffusion. One way of doing this is to contact the said filamentary material, before washing, with a shrinking or relaxation agent, e.g., an aqueous solution of sulfuric, hydrochloric or phosphoric acid in the concentrations and in the manner described in the copending application of Quynn, Jamison and Sobering, Ser. No. 464,317, filed June 16, 1965, and assigned to the same assignee as the present invention. Thus, relaxation may be effected by, for instance, contacting the filamentary material, before washing, with an aqueous solution containing, by weight, from 51 to 58%, preferably from 54 to 57%, $H_2SO_4$ for a period of at least ¼ second (e.g., from ½ second to 2 or 3 days) and at a temperature within the range of from ambient temperature to about 100° C., but usually not higher than about 90° or 95° C. The relaxation treatment also may be applied, if desired, to the washed but undried or to the washed and dried oriented filamentary material.

The liquid shrinking agent may be applied by immersing the shaped polymer, e.g., filaments, in an aqueous solution of the agent; by spraying or dripping the shrinking agent upon the shaped structure, e.g., continuously moving filaments when they are continuously advancing in a helical path over skewed rolls; or by brushing, padding or other conventional techniques for applying liquids to solid structures or substrates.

Instead of effecting relaxation of the filamentary material as described briefly above and more fully in the aforementioned Quynn et al. copending application, other means for causing the filamentary material to relax may be employed. For instance, one may use the technique disclosed and claimed in the copending application of Jamison and Soehngen, Ser. No. 481,587, filed Aug. 23, 1965, and assigned to the same assignee as the present invention. In this technique the oriented filamentary material is withdrawn from the coagulating bath by any suitable means and contacted with a liquid medium or a plurality of different liquid media which are effective in activating the aqueous acidic shrinking agent, e.g., $H_2SO_4$, retained or held by the oriented, gelled filamentary material. Also, in this technique, the concentration of $H_2SO_4$ in the solvent in which the polymer is dissolved to form the spinning dope, the concentration of the $H_2SO_4$ in the spin bath, the temperature of the said bath and the distance the coagulated filaments are led through the bath before being withdrawn therefrom are preferably so adjusted that the concentration of $H_2SO_4$ in the aqueous sulfuric acid retained by the filamentary material when it is removed from the bath is within the range of, by weight, from 51 to 58%, preferably from 54 to 57%, thereof.

In the technique briefly described in the preceding paragraph and more fully in the aforementioned Jamison et al. copending application, the liquid media that are useful in activating the aqueous sulfuric acid retained by the filamentary material are those which provide effective thermal contact for activation of the aforesaid retained sulfuric acid. (By "liquid" media are meant treating agents that are in liquid state at the treating temperature; they may be non-liquid, e.g., solids or semi-solids, at ambient temperature.) Additionally, the available evidence indicates that water-miscibility and a low rate of diffusion of the liquid treating or acid-activating agent into the gelled body are desirable characteristics of effective liquid media of this type. Examples of suitable media for this purpose are polyethylene glycols represented by the general formula VII 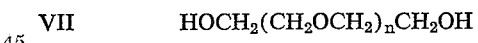 $HOCH_2(CH_2OCH_2)_nCH_2OH$ where $n$ is a number such that the average molecular weight of the said polyethylene glycol is within the range of from about 500 to about 10,000.

In general, the application temperatures (i.e., the temperatures at which the liquid treating or acid-activating agent is applied to the gelled material) are within the range of from about 50° C. up to a temperature just below (e.g., about 5° or 10° C. below) the temperature of incipient softening of the polymeric material. Usually, the upper temperature limit is not higher than about 150° C. In all cases the temperature employed is such as will convert the aforesaid treating agent to liquid state if it is not initially in such state.

The available evidence indicates that the contact time of the liquid acid-activating agent with the filamentary or other gelled structure being treated should, for optimum results, be sufficient to accomplish a rapid and efficient transfer of heat from the treating agent to substantially all of the aqueous sulfuric acid retained by the shaped, gelled polymer. At treating temperatures within the range of about 50°–150° C., this time is usually less than 5 minutes. At higher temperatures approaching the point of incipient softening of the shaped, gelled polymer and when the treating agent employed has a relatively low viscosity at the treating temperature, it may be necessary to limit the time of the treatment to ¼ second or less (that is, to cause it to occur almost instantaneously) in order to avoid or minimize fiber coalescence. The upper time limit at the application temperature is critical only to the extent that it should not be so long that the sulfuric acid in the gelled material during the treatment adversely affects the useful properties of the final product. The maximum treating time in some cases may be as long as 12 to 24 hours, or even 2 or 3 days or more, provided that there are no adverse effects such as an objectionable decrease in tensile strength; failure to obtain further improvement in dye-ability over that attained by modifying the primary polymer with a polymer of a polymerizable ethylenically unsaturated monomer containing basic nitrogen; discoloration; appreciable loss of luster; and the like.

Whatever the means employed in relaxing the oriented filamentary material, if the relaxation treatment has been applied to the unwashed or to the washed but undried filamentary material, any acid remaining therein must be removed, as by washing, before further processing of the filamentary material, e.g., before drying. If the relaxation technique has involved the use of a liquid acid-activating agent, this agent also must be removed, e.g., by washing with water if of the water-soluble type or by extraction with other suitable solvent if of the water-insoluble type. Generally both the excess acid the liquid acid-activating agent (if employed) are removed at the same time by washing the shaped gelled article with a mutual solvent for the aforesaid reagents.

It is not essential that the molecules of the gelled shaped article, e.g., gelled filamentary material, be oriented at least along the longitudinal axis thereof by snubbing or that orientation (whereby improved physical properties, e.g., improved tensile strength, are imparted to the filamentary material) be effected upon the gelled filaments before the excess acid has been removed, e.g., by washing. For example, the gelled filamentary material may be led from the coagulating bath to the first of a series of pairs of skewed rolls. The second pair of rolls of the series may be driven so that it revolves at a higher peripheral speed than the first so that the gelled filamentary material is stretched, thereby orienting the molecules along the fiber axis, as it passes between the two rolls. Draw ratios are preferably below 4.0 and may range, for instance, from 1.5 to 3.8. The stretched filamentary material may then be treated with a hot liquid acid-activating agent, e.g., polyethylene glycol, causing a rapid and efficient transfer of heat from the said agent to the aqueous sulfuric acid retained by the gelled filamentary material, and resulting in relaxation of the filaments. The hot liquid activating agent may be applied by passing the filamentary material through a bath of such a treating fluid as illustrated in FIG. 1 of the aforementioned Jamison et al. copending application, Ser. No. 481,587; or, as illustrated in FIG. 2 of the said application, while the gelled yarn or filamentary material is advancing over a pair of skewed rolls, the lower of which is partly immersed in a trough of the hot treating agent. The treated filamentary material is then washed and dried by any suitable means.

Or, instead of causing the filamentary material to be oriented and relaxed as described above, the unwashed gelled filamentary material may be treated with an aqueous solution containing, by weight, from 51 to 58% $H_2SO_4$ as hereinbefore described to effect relaxation thereof; and then, either before or after being water-washed to remove excess acid, it may be oriented by stretching between pairs of skewed rolls, the second of which is caused to revolve at a higher peripheral speed than that of the first.

Various other permutations of the orientation and relaxation steps will be apparent to those skilled in the art from the foregoing descriptions.

With further reference to the washing technique mentioned briefly hereinbefore, the following additional comments are made.

Washing may be effected while the gelled material, especially when it is a filamentary structure, is passing over a pair or a plurality of pairs of wash rolls or reels. Or, a wash trough or vessel, or a series of wash troughs or vessels through which the unwashed, gelled material passes, may be employed. Preferably, the unwashed material passes countercurrently to the flow of washing fluid.

The washing fluid may be water alone or a combination of water and other washing fluids in different permutations. For example, an initial wash with water may be followed at a second station by an alkaline wash (e.g., a water solution of ammonia, or an aqueous solution of sodium or potassium carbonate or bicarbonate), followed by another water wash at a third station; or the alkaline wash may be applied first followed by aw ater wash and then by a wash with a more volatile wash fluid than water, e.g., acetone, methanol, ethanol, or the like. Any desired or required number of wash stations may be employed to remove the excess acid and/or acid-activating agent (if the latter was employed) from the treated, gelled material, e.g., 1, 2 or 3 through 10 stations, or more, if necessary.

The washed, gelled material is then dried by any suitable means either before or after collection on a take-up roll. In many cases, passage of the gelled structure (particularly if in film form) through air at room temperature causes the film to dry sufficiently for take-up (without sticking of contacting layers on the rolls), especially if a volatile solvent such as methanol has been applied as a final wash before take-up, and the time of exposure to air has been sufficiently long to volatilize substantially all of the solvent. Washed films also may be dried by, for example, passing the film through a drying zone such as a heated oven while held on a support. Preferably washed, gelled filaments, sheets, films and other elongated structures of continuous (i.e., indefinite) length are dried by passage over the warm or hot (e.g., up to about 110° C.) surfaces of a heated roll. Where discoloration under heat may be objectionable, e.g., in the production of thin transparent films, drying at an elevated temperature is preferably done in a non-oxidizing atmosphere, e.g., nitrogen, helium, argon, etc.

In accordance with another embodiment of the present invention the dried shaped polymeric material, e.g., filamentary material, is treated with a quaternizing agent, more particularly a hydrocarbon halide quaternizing agent, e.g., benzyl chloride, for a period of time sufficient to effect a further improvement in the acid dyeability of the said shaped material. When the shaped polymeric material to be treated is of continuous or indefinite length, e.g., in the form of a continuous film, tape, yarn or the like, the aforesaid treating agent is preferably applied to the continuous filamentary material or other elongated article or structure while the material being treated is held taut, i.e., while held under sufficient tension that it is not free-to-shrink during the treatment.

The treatment of the dried, shaped article with benzyl chloride or other quaternizing agent may be applied at a treating temperature ranging from ambient temperature (e.g., 20°–30° C.) to not higher than about 50° C., and for a period of time sufficient to effect a further improvement in the acid dyeability of the material undergoing treatment, e.g., filamentary material.

Instead of using benzyl chloride as a treating agent (herein also designated as a "quaternizing agent" since it is probable that it functions at least in part as such), we may use other hydrocarbon halide quaternizing agents, for example, benzyl bromide, benzyl iodide, allyl chloride, allyl bromide, methyl iodide, naphthyl iodide, 4-chloropyridine, 2-chloro-3-nitropyridine, chloroacetone, bromoacetone, cyanohydrin, chloroacetopyrocatechol, and other organic halides that react (Menschutkin reaction) with pyridine derivatives to form quaternary pyridinium compounds.

After treatment with the hydrocarbon quaternizing agent, e.g., a hydrocarbon chloride, and specifically benzyl chloride, as above-described, the treated shaped article, e.g., filamentary material, is washed with one or more organic solvents to remove the excess treating agent. For example, the taut fibers may be rinsed in a volatile hydrocarbon solvent, e.g., petroleum ether, followed by rinsing in a lower alkanol, e.g., methanol, at the end of the treating period with benzyl chloride or its equivalent. They are then dried, e.g., in air at room temperature, and preferably while they are held taut since optimum improvement in dyeability of the filamentary material is obtained only when the filaments are dyed in taut state.

From the foregoing description it will be seen that the present invention provides extrudable liquid compositions, especially spinning solutions or dopes, adapted for wet-forming (e.g., wet-spinning) shaped articles such as films, filaments and the like. These compositions comprise a solvent, more particularly an inorganic solvent, having dissolved therein a primary polymer and a modifying polymer. Examples of such solvents have been given hereinbefore, as well as numerous examples of the primary and modifying polymers, the weight proportions thereof with respect to the total polymer content of the extrudable composition, and the concentration of the total primary and modifying polymers in the said extrudable composition.

The solutions are prepared, for example, by dissolving the finely divided polymers, with stirring, in the chosen solvent, which is preferably sulfuric acid containing at least 75% by weight of $H_2SO_4$. Mixing is generally effected at about 35° to about 55° or 60° C., and is continued until both the primary and modifying polymers have substantially completely dissolved, e.g., for from 1 to 5 or 6 hours. If desired, there may also be dissolved in the sulfuric acid solvent at least 1%, more particularly from 1 to 15%, based on the weight of the said solvent, of a salt that yields ions in solution that have an affinity for protons at least equal to bisulfate ions. Examples of such salts are the ammonium and alkali-metal sulfates and phosphates, including ammonium, sodium and potassium sulfates, diammonium phosphate and disodium phosphate. Other and more specific examples and the advantages of such additives are given in the aforementioned Epstein et al. Pat. No. 3,154,613.

If desired, one may first prepare a solution of the primary polymer in the absence of the modifying polymer following the same procedure described above, and then dissolve the finely divided modifying polymer in the resulting solution.

Before extruding the extrudable liquid composition it may be filtered if deemed necessary or desirable; usually, also, it is deaerated by any suitable means, e.g., by centrifuging. The temperature of this liquid composition or dope may range, for example, from ambient temperature (e.g., 20°–30° C.) to 100° C. immediately prior to extrusion through a shaped orifice, e.g., a spinneret, into a liquid coagulating bath wherein the shaped article, e.g., filamentary material, is formed.

The present invention also provides a method which includes the steps of (a) preparing an extrudable liquid composition, e.g., a spinning solution or dope such as has been described hereinbefore, and (b) wet-forming the resulting composition into a shaped article, e.g., filaments. More particularly, there is provided by the instant invention a method which comprises extruding an extrudable liquid composition of the invention through a shaped orifice into a liquid coagulating bath of the kind hereinbefore described, whereby the solution of the polymeric material is coagulated into the form of a gelled shaped article having incorporated therein a polymer of a polymerizable ethylenically unsaturated organic compound that contains basic nitrogen, e.g., a polymer of a vinylpyridine or other vinyl-substituted heterocyclic tertiary amine. Excess sulfuric acid is removed from the gelled article, e.g., by washing and/or neutralization of the acid. In order to improve the physical properties of the shaped article, e.g., tensile strength, it is desirable to effect orientation of the molecules of gelled films, filaments and the like at least along the longitudinal axis thereof before or after the excess sulfuric acid has been removed, e.g., by washing. Orientation of elongated articles of indefinite length, e.g., continuous filament yarn, can be effected, for example, by snubbing and/or stretching. Orientation of films can be effected by biaxial stretching. The dried shaped article is then dried.

In a preferred method feature of the invention, after orienting the molecules of an elongated gelled shaped article, e.g., gelled filamentary material of continuous length, along the fiber axis thereof, the resulting oriented gelled filamentary material is then relaxed in order to further improve the dye-receptivity of the dried final product. Such relaxation preferably is effected by contacting the oriented gelled filamentary material, before washing, with a relaxation or shinking agent in the form of an aqueous solution containing, by weight, from 51% to 58% $H_2SO_4$ for a period of at least ¼ second and at a temperature within the range of from ambient temperature to about 100° C.

Other method features of the invention include the additional step of contacting the dried filamentary material with a hydrocarbon halide or equivalent quaternizing agent, e.g., benzyl chloride, in order to effect a further dyeability, especially acid-dyeability, improvement.

The article features of the invention include shaped articles comprising the modified condensation polymer hereinbefore described and which are obtained by wet-forming the extrudable liquid compositions of the invention. More particularly it includes filamentary materials that have been wet-spun from such extrudable compositions; and still more specifically, filamentary materials which, after having been formed, washed and dried, have been contacted with a quaternizing agent (numerous examples of which have been given hereinbefore) for a period of time sufficient to effect a still further improvement in their acid dyeability.

In order that those skilled in the art may better understand how the present invention can be carried into effect, the following examples are given by way of illustration and not by way of limitation. All parts and percentages are by weight unles otherwise stated.

EXAMPLE 1

Preparation of solution A (control)

An extrudable solution, having a Synchro-Electric viscosity at 25° C. of about 4000 poises, is made from the following:

| | Parts |
|---|---|
| Polyhexamethylene terephthalamide | 11.7 |
| Sulfuric acid, 99.5% | 80.0 |
| Water | 2.1 |
| Ammonium sulfate | 6.2 |

The ammonium sulfate is added to the concentrated sulfuric acid at room temperature (20°–30° C.), and the mixture is stirred at the same temperature until the ammonium sulfate goes into solution. The polyhexamethylene terephthalamide in finely divided state is added to, and admixed with, the solution of ammonium sulfate in the sulfuric acid. Mixing is effected at about 40°–50° C., and is continued until the polymer has substantially completely dissolved, e.g., for about 2 hours. The polymer component of this solution has an inherent viscosity (I.V.) of about 1.9 measured as a solution of 0.4 gram of polymer per deciliter of concentrated sulfuric acid at 25° C.

Preparation of solution B

| | Parts |
|---|---|
| Solution A | 400 |
| Poly(5-ethyl-2-vinylpyridine) | 1 |

The above polymer is a homoplymer of 5-ethyl-2-vinylpyridine, which also properly may be designated as 2-vinyl-5-ethylpyridine. Solution B is prepared merely by dissolving 1 part of the finely divided PEVP with stirring in solution A while heating the mixture at about 40°–50° C. If a slightly cloudy dope is obtained, it can be cleared by further dilution with a small amount of either concentrated sulfuric acid or with aqueous sulfuric acid of lower concentration, e.g., aqueous sulfuric acid containing 50% or more of $H_2SO_4$. The I.V. of the PEVP used in making B solution is 2.6 measured as a 0.1% solution in methylene chloride at 25° C.

Each of solutions A and B is individually spun as follows:

A dope bomb under nitrogen pressure is used in feeding the individual solution, after filtration and deaeration, through a platinum spinneret containing 40 holes of 0.10 mm. diameter into a liquid coagulating bath consisting of aqueous 48–49% $H_2SO_4$ at 50° C. This coagulating bath is circulated through a rectangular trough formed of clear poly(methyl methacrylate) by an external Jabsco pump equipped with a by-pass. Constant temperature in the coagulating bath is maintained with a glass-enclosed electric heater and a glass-enclosed thermoregulator.

Snubbing pins or rods for effecting orientation of the filamentary material are positioned vertically in the bath from above. The pins are comprised of ¼-inch Alsimag rods held ⅝-inch between centers in a 2-hole rubber stopper which is fixed in a clamp above the bath. The stopper is rotated to provide the desired snubbing angle, specifically 85° in this example. The snubbing rods are positioned 38 inches from the spinneret face.

In order to provide enhanced dyebath diffusion the filamentary material is relaxed after withdrawal from the coagulating bath, and before washing with water, by immersion over a distance of 16 inches in a 55.5–56.0 aqueous sulfuric acid bath at 85° C. The take-up speed is such that the yarn has a residence time in the bath of about 0.8 second. In corresponding paired runs of solutions A and B, the above-described shrinkage or relaxation treatment by passage through the aqueous sulfuric acid bath is by-passed in one set of runs.

Finally, the continuous filamentary yarn is led through a traversing mechanism to a perforated "Viscose"-type take-up bobbin where it is taken-up at 30 meters per minute under a stream of hot water. The bobbin of yarn is then washed completely free of sulfuric acid by immersion for about 16 hours in cold, running, tap water. Thereafter it is dried in air at room temperature.

Instead of washing and drying the yarn as described above, it may be washed and dried by any other means or combination of means such as has previously been described in a portion of this specification prior to the examples. Also, instead of effecting orientation of the filaments by snubbing, the snubbing pins can be omitted from the coagulating bath and orientation of the filaments effected outside the coagulating bath by stretching the filaments during their passage between pairs of skewed or draw rolls, the second pair of which is revolving at a higher peripheral speed than that of the first. This technique also was more fully described in a portion of the specification before the examples.

The tensile properties and acid-dyeability characteristics of continuous filamentary yarns obtained from solutions A and B are given in Table I. The dried yarn made from solution B was found by analysis to contain 1% PEVP. The dyeability values given in the table represent the percent up-take on the weight of the fiber (i.e., O.W.F.) of the acid dye, Alizarine Sky Blue BS–CF (C.I. No. Acid Blue 78), from a standardized "infinite" dye bath in 2 hours at 97° C., at a pH of 2.5, using a 0.1 gram portion of fiber and a dyestuff content of the bath that is 1.5 times the weight of the fiber.

TABLE I

| Polymer solution | Acid relaxation treatment at 85° C. | Denier | Ten., g./d. | Elong., percent | Dye uptake by alizarine Sky Blue BS–CF, percent O.W.F |
|---|---|---|---|---|---|
| Solution A | No | 2.3 | 5.6 | 33 | 0.7 |
|  | Yes | 2.3 | 5.5 | 35 | 2.7 |
| Solution B | No | 2.3 | 5.2 | 28 | 0.7 |
|  | Yes | 2.3 | 5.2 | 28 | 3.6 |

EXAMPLE 2

Same as in Example 1 with the exception that, instead of using a homopolymer of 2-ethyl-5-vinylpyridine (i.e., 5-vinyl-2-ethylpyridine) as in Example 1 in making up solution B, solution B is made up to contain, in one case, 2 parts of a homopolymer of 2-vinylpyridine, and in another case 1½ parts of a homopolymer of 2-methyl-5-vinylpyridine. Similar improvement in acid dye-receptivity is obtained.

Instead of using homopolymeric 2-vinylpyridine or homopolymeric 2-methyl-5-vinylpyridine as in this example, one may use an equivalent amount of any other homopolymer of a vinylpyridine or of any other vinyl-substituted heterocyclic tertiary amine, numerous examples of which polymerizable compounds have been given hereinbefore. Or, in lieu of these compounds one may substitute an equivalent amount of a homopolymer or of a copolymer (in proportions and kinds of co-monomers as previously have been described) of other homopolymerizable or copolymerizable ethylenically unsaturated organic compounds containing a basic nitrogen atom, e.g., 2-vinylbenzimidazole, diethylaminoethyl acrylate and methacrylate, bis(2-diethylaminoethyl)fumarate, maleate and itaconate, the various monoaminostyrenes and monoamino-substituted vinyltoluenes, wherein the amino nitrogen is tertiary (the amino hydrogen atoms being substituted with, for example, a methyl or ethyl radical), 2-(4'-morpholinyl)ethyl acrylates and methacrylates, as well as homopolymers or copolymers of other compounds embraced by Formulas V and VI, and of other homopolymerizable or copolymerizable ethylenically unsaturated organic compounds containing basic nitrogen, numerous examples of which have been given hereinbefore.

EXAMPLE 3

This example illustrates the further improvement in acid dye-receptivity that can be obtained by treating the washed and dried filamentary material with a hydrocarbon halide quaternizing agent, specifically benzyl chloride.

The same general procedure is followed as described in Example 1 in preparing continuous filament yarns from spinning dopes which are essentially the same as spinning solutions A and B of that example, the A solution containing unmodified polyhexamethylene terephthalamide and the B solution containing polyhexamethylene terephthalamide modified with approximately the same amount of homopolymeric 5-ethyl-2-vinyl-pyridine as in Example 1.

The washed and dried continuous filament yarns are wound on frames made from stainless steel rods, which are then immersed in benzyl chloride at the temperatures and for the time periods set forth in Table II. Except as noted, the taut fibers are rinsed in petroleum ether and then in methanol after removal from the benzyl chloride. After drying they are dyed taut or slack, as indicated in the table, in a standard "infinite" dye bath as in Example 1 but modified to accommodate the 2-inch by 4-inch frames on which the yarn is held. As shown in Table II, the contribution of the benzyl chloride treatment is effective only when the yarn is dyed taut. It would appear that the benzyl chloride treatment does not provide the improvement in dyeability exclusively as a result of quaternization of the pyridine nitrogen since the dyeability of the filaments obtained from solution A is increased appreciably by the said treatment, although to a smaller extent than that of the filaments produced from solution B. Only a very slight contribution to improved dyeability of tautness of the filaments during dyeing is observed in the absence of both the benzyl chloride after-treatment and the use of a poly(vinyl-pyridine)-modified polyhexamethylene terephthalamide. A small loss in tenacity occurs when the methanol rinse is omitted after room-temperature (R.T.) immersion. No significant influence is noted using immersion-treating periods beyond 1 hour.

washed to remove excess quaternizing agent and dried prior to said dyeing operation.

TABLE II

| Polymer solution | Acid relaxation treatment | Benzyl chloride treatment Time, hrs. | Benzyl chloride treatment Temp., °C. | Condition of fiber during dyeing | Fiber dyeability, percent Slack | Fiber dyeability, percent Taut | Denier | Ten., g./d. | Elong., percent | TE 1/3 |
|---|---|---|---|---|---|---|---|---|---|---|
| Solution A (no PEVP in fiber) | No | | R.T.[1] | | 0.7 | | 2.3 | 5.6 | 33 | 32 |
| | | 1 | R.T. | Taut | 0.4 | | | | | |
| | | 16 | R.T. | do | 0.7 | | 2.2 | 5.5 | 29 | 30 |
| | Yes | | | | 2.7 | 3.0 | 2.3 | 5.7 | 37 | 34 |
| | | 1 | R.T. | Taut | 2.4 | 5.0 | 2.2 | 4.5 | 29 | [2]24 |
| | | 16 | R.T. | do | 3.0 | 4.4 | 2.1 | 5.3 | 29 | 29 |
| Solution B (1% PEVP in fiber) | No | | | | 0.7 | | 2.3 | 5.2 | 28 | 27 |
| | | 1 | R.T. | Taut | 0.6 | | 2.8 | 4.6 | 37 | 28 |
| | | 16 | R.T. | do | 0.7 | 1.4 | 2.5 | 4.7 | 29 | 26 |
| | Yes | | | | 3.7 | 4.8 | 2.3 | 5.2 | 28 | 27 |
| | | 1 | R.T. | Taut | 3.2 | 7.2 | 2.3 | 5.1 | 30 | 28 |
| | | 16 | R.T. | do | 3.5 | 6.9 | 2.9 | 4.2 | 29 | [2]23 |
| | Yes | | | | 3.5 | | 2.3 | 4.8 | 28 | 25 |
| | | 1 | R.T. | Slack | 3.4 | | 2.4 | 4.4 | 32 | 25 |
| | | 48 | R.T. | do | 3.7 | | 2.4 | 4.5 | 32 | 26 |

[1] "R.T."=20°-25° C. (i.e., room temperature).
[2] The methanol rinse after the benzyl chloride treatment was omitted.

EXAMPLE 4

Example 1 is repeated with the exception that, instead of using 11.7 parts of polyhexamethylene terephthalamide in the preparation of solution A, there is used 11.7 parts of polyhexamethylene isophthalamide. Similar improvement in acid dye-receptivity of the continuous-filament yarns made from 400 parts of this solution modified with 1 part of PEVP is obtained.

Instead of using polyhexamethylene terephthalamide or polyhexamethylene isophthalamide in making the extrudable liquid compositions as in the foregoing examples, one may use other wet-formable, difficultly-meltable condensation polymers, especially those having nitrogen and/or oxygen as an integral part of the polymer chain, numerous examples of which polymers have been given hereinbefore. The wet-formed, shaped articles, e.g., filamentary materials, made from the resulting solutions show improved acid dye-receptivity as compared with the same condensation polymers that have not been modified, in accordance with the present invention, with a polymer of a polymerizable or copolymerizable ethylenically unsaturated organic compound that contains basic nitrogen.

It is to be understood that the foregoing detailed description is given merely by way of illustration and that many variations may be made therein without departing from the spirit of the invention or from the scope of the claims.

What is claimed is:

1. A process for improving the acid dyeability of a wet-spinnable difficultly-meltable condensation polymer (a) selected from the group consisting of polyamides melting at about 210° C. and polyurethanes and polyureas melting above 179° C. having poor acid dye receptivity, which process comprises forming a wet-spinnable liquid composition comprising a solvent selected from the group consisting of concentrated sulfuric acid of at least 75% sulfuric acid by weight, concentrated phosphoric acid of at least 85% phosphoric acid by weight and concentrated antimony trichloride of at least 70% by weight of antimony trichloride in up to 30 weight percent formic and/or acetic acid having dissolved therein said condensation polymer (a) and a polymer (b) to improve said acid dye receptivity in an amount from 0.5 to 30 percent by weight of the total amount of the polymers of (a) and (b), said polymer (b) being of polymer of a polymerizable substituted heterocyclic tertiary amine, the polymers of (a) and (b) being compatible with each other in dissolved state; wet spinning the resulting composition into a filament; applying a hydrocarbon halide quaternizing agent to the filament to further improve the acid dye receptivity of said filament and dyeing said filament with an acid dye while said filament is in a taut condition during said dyeing operation.

2. The process of claim 1 wherein said filament is

3. The process of claim 1 wherein the solvent in which the polymers are dissolved is sulfuric acid containing at least 75% by weight of $H_2SO_4$.

4. The process of claim 1 wherein the solvent is sulfuric acid of at least 75 percent concentration and a total amount of the polymers of (a) and (b) dissolved in said solvent is from about 0.5 to 30 weight percent of the solution.

5. The process of claim 1 wherein the polymer of (a) is a polycarbonamide melting above 275° C. and the polymer of (b) is a polymer of a (lower-alkyl)-substituted vinylpyridine.

6. The process of claim 1 wherein said solvent comprises sulfuric acid containing at least 75% by weight of $H_2SO_4$ and in which is dissolved.

(a) a wet-spinnable poly(polymethylene)terephthalamide, and (b) from about 1% to about 10%, by weight, of the total amount of the polymers of (a) and (b), of a polymer of a vinylpyridine, the total amount of the polymers of (a) and (b) dissolved in the sulfuric acid solvent being from about 5% to about 20% by weight of the said solution.

7. The method of claim 4 wherein said wet-spinnable composition is spun through a shaped orifice into a liquid coagulating bath, the liquid coagulating bath into which the said liquid composition is spun being aqueous sulfuric acid having a concentration lower than that of the sulfuric acid in which the polymeric material contained in the said liquid composition is dissolved, said concentration being as low as 0% sulfuric acid prior to said spinning, said concentration being such that the solution of the polymeric material is coagulated into the form of a gelled filament having incorporated therein a polymer of a vinylpyridine; excess sulfuric acid is removed from the gelled filament; and the gelled filament is dried before contact with said quaternizing agent.

8. The method as in claim 7 wherein the excess sulfuric acid is removed from the gelled filament by washing, and the molecules of the gelled filament are oriented at least along the longitudinal axis thereof before or after the excess sulfuric acid has been washed therefrom.

9. The method as in claim 7 wherein the polymer of a vinylpyridine is a polymer of an ethyl-substituted vinylpyridine.

10. The method as in claim 9 wherein the polymer of an ethyl-substituted vinylpyridine is homopolymeric 2-vinyl-5-ethylpyridine.

11. The method as in claim 7 wherein the wet-spinnable liquid composition is wet spun through an orifice shaped to yield filamentary material upon coagulation in the defined liquid coagulating bath.

12. The method of claim 7 which comprises:

(a) wet-spinning a solvent solution of polymeric material through a shaped orifice into a liquid coagulating bath in which the solution of the polymeric material is coagulated to yield a filamentary material in gel state, said polymeric material consisting essentially of:
(1) poly(polymethylene)terephthalamide and
(2) from about 1% to about 10%, by weight, of the total amount of the polymers of (1) and (2) of a polymer of a vinylpyridine, the solution in which the said polymeric material is dissolved being sulfuric acid containing at least 80% by weight of $H_2SO_4$, and the liquid coagulating bath into which the said solvent solution is wet spun being aqueous sulfuric acid having a concentration lower than that of the sulfuric acid in which the polymeric material is dissolved and such that the solution of the polymeric material is coagulated into the form of gelled filamentary material having incorporated therein a polymer of a vinylpyridine;
(b) orienting the molecules of the gelled filamentary material along the fiber axis;
(c) relaxing the oriented, gelled, filamentary material;
(d) washing and drying the relaxed filamentary material before applying said quaternizing agent; and
(e) substantially preventing free shrinkage of said filament during said application of quaternizing agent.

13. The method as in claim 12 wherein the poly(polymethylene)terephthalamide is polyhexamethylene terephthalamide; the liquid coagulating bath into which the solvent solution of the polymeric material is wet spun is aqueus sulfuric acid having a concentration of from 40% to 50% $H_2SO_4$; the molecules of the gelled filamentary material are oriented along the fiber axis by snubbing; and the oriented, gelled, filamentary material is relaxed by contacting it, before washing, with a relaxation agent in the form of an aqueous solution containing, by weight, from 51% to 58% $H_2SO_4$ for a period of at least ¼ second and at a temperature within the range of from ambient temperature to about 100° C.

14. A method as in claim 12 wherein the quaternizing agent is benzyl chloride and the said filamentary material is immersed in the said benzyl chloride at a temperature ranging from ambient temperature to about 50° C. and for a period of time sufficient to effect the further improvement in the acid dyeability of the said filamentary material but insufficient to cause material softening thereof.

References Cited

UNITED STATES PATENTS

| | | | |
|---|---|---|---|
| 2,687,938 | 8/1954 | Chaney | 8—55 |
| 3,050,482 | 8/1962 | Cobb et al. | |
| 3,151,928 | 10/1964 | Cappuccio | 8—115.5 |
| 3,154,613 | 10/1964 | Epstein | 264—184 |
| 3,216,965 | 11/1965 | Cipriani | 260—37 |
| 3,294,752 | 12/1966 | Wilkinson | 260—77.5 |
| 3,313,591 | 4/1967 | Tanner | 8—115.5 |
| 2,693,995 | 11/1954 | Hannay et al. | |
| 3,038,237 | 6/1962 | Taylor | 28—82 |
| 3,424,820 | 1/1969 | Magat et al. | 260—857 |

JULIUS FROME, Primary Examiner

J. H. WOO, Assistant Examiner

U.S. Cl. X.R.

8—115.5, 130.1; 260—857; 264—184, 210, 342, 343

UNITED STATES PATENT OFFICE
CERTIFICATE OF CORRECTION

Patent No. 3,532,778      Dated October 6, 1970

Inventor(s) Saunders E. Jamison, Michael Dunay

It is certified that error appears in the above-identified patent and that said Letters Patent are hereby corrected as shown below:

Claim 1, column 17, line 52, "about" should be ---above---

Signed and sealed this 11th day of January 1972.

(SEAL)
Attest:

EDWARD M. FLETCHER, JR.          ROBERT GOTTSCHALK
Attesting Officer                    Acting Commissioner of Patents